(12) United States Patent
Aitken et al.

(10) Patent No.: US 7,635,521 B2
(45) Date of Patent: Dec. 22, 2009

(54) GLASS COMPOSITIONS FOR PROTECTING GLASS AND METHODS OF MAKING AND USING THEREOF

(75) Inventors: Bruce G. Aitken, Corning, NY (US); Josef C. Lapp, Corning, NY (US)

(73) Assignee: Corning Incorporated, Corning, NY (US)

( * ) Notice: Subject to any disclaimer, the term of this patent is extended or adjusted under 35 U.S.C. 154(b) by 364 days.

(21) Appl. No.: 11/351,360

(22) Filed: Feb. 10, 2006

(65) Prior Publication Data

US 2007/0190338 A1 Aug. 16, 2007

(51) Int. Cl.
- B32B 17/06 (2006.01)
- C03C 8/08 (2006.01)
- C03B 1/00 (2006.01)

(52) U.S. Cl. .......................... 428/426; 501/24; 501/55; 65/136.1

(58) Field of Classification Search .................. 428/426, 428/428; 501/11, 66, 69, 70, 24, 55; 65/136.1
See application file for complete search history.

(56) References Cited

U.S. PATENT DOCUMENTS

| | | | |
|---|---|---|---|
| 3,338,696 A | 8/1967 | Dockerty | 65/145 |
| 3,642,504 A | 2/1972 | Petzold et al. | 106/39 |
| 3,682,609 A | 8/1972 | Dockerty | 65/83 |
| 3,977,886 A | 8/1976 | Muller | 106/39.7 |
| 4,102,664 A | 7/1978 | Dumbaugh, Jr. | 65/23 |
| 4,214,886 A | 7/1980 | Shay et al. | 65/121 |
| 4,731,293 A * | 3/1988 | Ekholm et al. | 428/426 |
| 4,880,453 A | 11/1989 | Coppola et al. | 65/23 |
| 5,176,729 A * | 1/1993 | Bernard et al. | 65/470 |
| 5,374,595 A | 12/1994 | Dumbaugh et al. | 501/66 |
| 6,060,168 A | 5/2000 | Kohli | 428/428 |
| 6,197,429 B1 | 3/2001 | Lapp et al. | 428/450 |
| 6,319,867 B1 | 11/2001 | Chacon et al. | 501/66 |
| 2002/0082158 A1 | 6/2002 | Chacon et al. | 501/66 |
| 2004/0029702 A1 | 2/2004 | Naumann et al. | 501/70 |
| 2004/0224834 A1 * | 11/2004 | Kohli | 501/70 |
| 2005/0001201 A1 | 1/2005 | Bocko et al. | 252/299.01 |
| 2005/0084440 A1 | 4/2005 | Chacon et al. | 423/328.1 |
| 2005/0209084 A1 * | 9/2005 | Takaya et al. | 501/11 |

FOREIGN PATENT DOCUMENTS

| | | |
|---|---|---|
| ES | 2 190 356 | 7/2003 |
| JP | 8-277142 | 10/1996 |
| JP | 2002-3240 | 1/2002 |
| JP | 2002-003240 | 1/2002 |
| JP | 2003-192377 | 7/2003 |
| WO | WO 2005/066091 | 7/2005 |
| WO | WO 2006/023594 | 3/2006 |

* cited by examiner

Primary Examiner—Timothy M Speer
Assistant Examiner—Lauren Robinson
(74) Attorney, Agent, or Firm—Lawrence A. Villanueva; Thomas R. Beall

(57) ABSTRACT

The subject matter disclosed herein generally relates to glass compositions for protecting glass and methods of making and using the compositions.

23 Claims, 5 Drawing Sheets

GLASS COMPOSITIONS FOR PROTECTING GLASS AND METHODS OF MAKING AND USING THEREOF

FIELD

The subject matter disclosed herein generally relates to glass compositions for protecting glass and methods of making and using the compositions.

BACKGROUND

Displays may be broadly classified into one of two types: emissive (e.g., CRTs and plasma display panels (PDPs)) or non-emissive. This latter family, to which liquid crystal displays (LCDs) belong, relies upon an external light source, with the display only serving as a light modulator. In the case of liquid crystal displays, this external light source can be either ambient light (used in reflective displays) or a dedicated light source (such as found in direct view displays).

Liquid crystal displays rely upon three inherent features of the liquid crystal (LC) material to modulate light. The first is the ability of the LC to cause the optical rotation of polarized light. Second is the ability of the LC to establish this rotation by mechanical orientation of the liquid crystal. The third feature is the ability of the liquid crystal to overwrite this mechanical orientation by the application of an external electric field.

In the construction of a simple, twisted nematic (TN) liquid crystal display, two substrates surround a layer of liquid crystal material. In a display type known as Normally White, the application of alignment layers on the inner surface of the substrates creates a 90° spiral of the liquid crystal director. This means that the polarization of linearly polarized light entering one face of the liquid crystal cell will be rotated 90° by the liquid crystal material. Polarization films, oriented 90° to each other, are placed on the outer surfaces of the substrates.

Light, upon entering the first polarization film, becomes linearly polarized. Traversing the liquid crystal cell, the polarization of this light is rotated 90° and is allowed to exit through the second polarization film. Application of an electric field across the liquid crystal layer aligns the liquid crystal directors with the field, interrupting its ability to rotate light. Linearly polarized light passing through this cell does not have its polarization rotated and hence is blocked by the second polarization film. Thus, in the simplest sense, the liquid crystal material becomes a light valve, whose ability to allow or block light transmission is controlled by the application of an electric field.

The above description pertains to the operation of a single pixel in a liquid crystal display. High information type displays require the assembly of a few million of these pixels, which are referred to as sub pixels, into a matrix format. Addressing, or applying an electric field to, all of these sub pixels while maximizing addressing speed and minimizing cross-talk presents several challenges. One of the preferred ways to address sub pixels is by controlling the electric field with a thin film transistor located at each sub pixel, which forms the basis of active matrix liquid crystal display devices (AMLCDs).

The manufacturing of these displays is extremely complex, and the properties of the substrate glass are extremely important. First and foremost, the glass substrates used in the production of AMLCD devices need to have their physical dimensions tightly controlled. The downdraw sheet or fusion process, described in U.S. Pat. No. 3,338,696 (Dockerty) and U.S. Pat. No. 3,682,609 (Dockerty), is one of the few capable of delivering such product without requiring costly post forming finishing operations, such as lapping and polishing.

Typically, the two substrates that comprise the display are manufactured separately. One, the color filter plate, has a series of red, blue, and green organic dyes deposited on it. Each of these primary colors must correspond precisely with the pixel electrode area of the companion, active, plate. To remove the influence of differences between the ambient thermal conditions encountered during the manufacture of the two plates, it is desirable to use glass substrates whose dimensions are independent of thermal condition (i.e., glasses with lower coefficients of thermal expansion). However, this property needs to be balanced by the generation of stresses between deposited films and the substrates that arise due to expansion mismatch. It is estimated that an optimal coefficient of thermal expansion is in the range of $28\text{-}33 \times 10^{-7}/°$ C.

The active plate, so called because it contains the active, thin film transistors, is manufactured using typical semiconductor type processes. These include sputtering, CVD, photolithography, and etching. It is highly desirable that the glass be unchanged during these processes. Thus, the glass needs to demonstrate both thermal and chemical stability.

Thermal stability (also known as thermal compaction or shrinkage) is dependent upon both the inherent viscous nature of a particular glass composition (as indicated by its strain point) and the thermal history of the glass sheet as determined by the manufacturing process. U.S. Pat. No. 5,374,595 discloses that glass with a strain point in excess of 650° C. and with the thermal history of the fusion process will have acceptable thermal stability for active plates based both on a-Si thin film transistors (TFTs) and super low temperature p-Si TFTs. Higher temperature processing (such as required by low temperature p-Si TFTs) may require the addition of an annealing step to the glass substrate to ensure thermal stability.

Chemical stability implies a resistance to attack of the various etchant solutions used in the manufacture processes. Of particular interest is a resistance to attack from the dry etching conditions used to etch the silicon layer. To benchmark the dry etch conditions, a substrate sample is exposed to an etchant solution known as 110 BHF. This test comprises immersing a sample of glass in a solution of 1 volume of 50 wt. % HF and 10 volumes 40 wt. % $NH_4F$ at 30° C. for 5 minutes. The sample is graded on weight loss and appearance.

In addition to these requirements, display manufacturers also require substrates with extremely smooth surfaces. Currently, the fusion process offers the potential of a "fire-polished" surface, which is smooth to an atomistic level (Ra of about 0.3 nm as measured by AFM over a 20 micron area). However, subsequent processing steps, such as sheet separation, packaging, etc, can degrade the surface condition through the presence of particles and/or surface damage. To protect against such extrinsic damage, substrate glass can be coated with various polymer films to protect the glass surface during shipment between the substrate manufacture and display manufacture. Also, coating the substrate can enable substrates to be densely packed together in the final shipping configuration.

Current methods for coating substrate glass with a protective polymer film suffer from a couple of shortcomings. First, the polymer coating must be applied to the glass cold to prevent staining of the glass. This means that the coating is not present to protect the surface against particle contamination arising from these two steps. Second, since the polymer coating is not transparent, the coating must be removed from the glass after finishing to allow for the final quality inspection processes. What is needed in the art are substrate glasses with properties suitable for use in displays, and methods and compositions for protecting the surfaces of such substrates during substrate manufacture, shipping, and beyond. The compositions and methods disclosed herein meet these and other needs.

SUMMARY

In accordance with the purposes of the disclosed materials, compounds, compositions, articles, devices, and methods, as embodied and broadly described herein, the disclosed subject matter, in one aspect, relates to glass compositions for protecting glass and methods of making and using the compositions. Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

DETAILED DESCRIPTION

Figure 1:
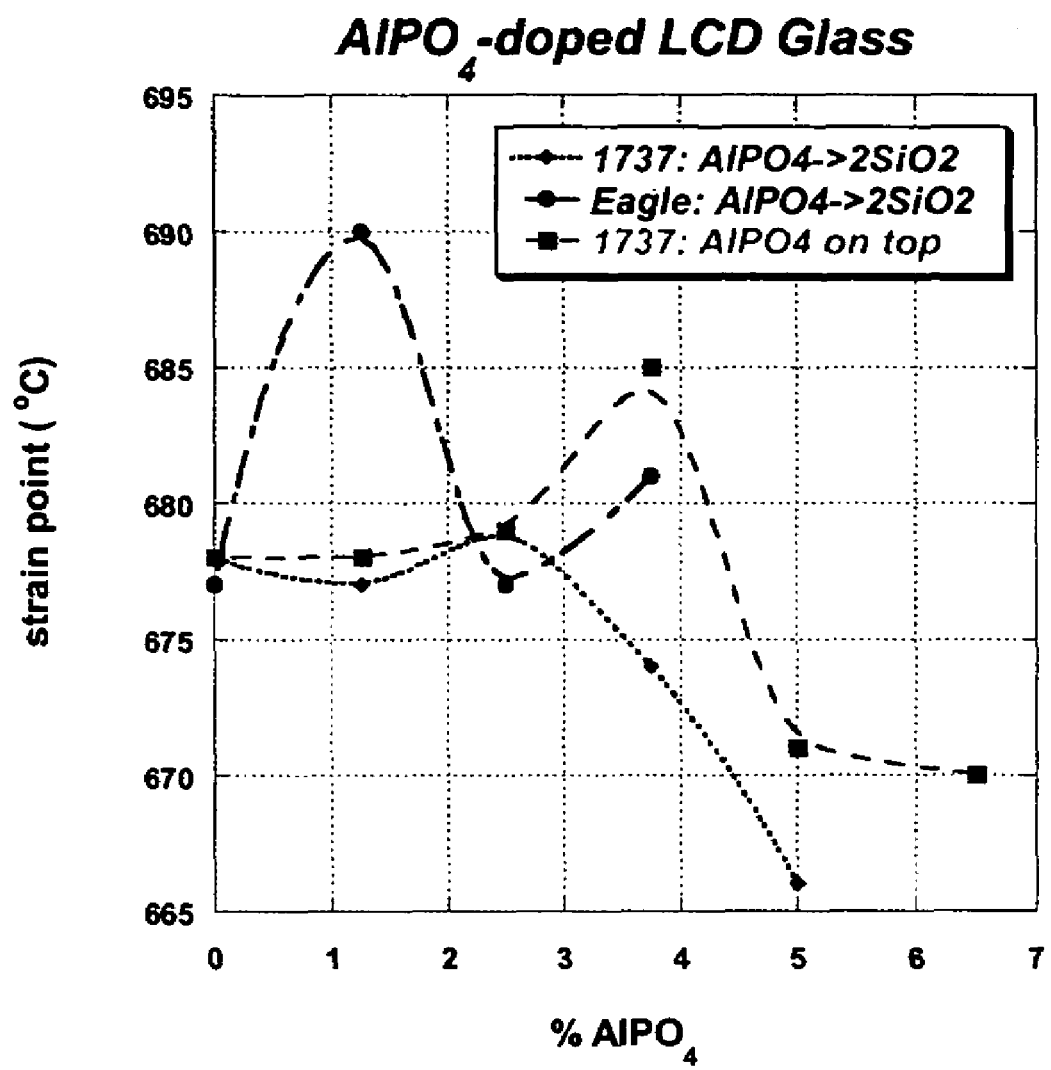
FIG. 1 is a graph of strain point (° C.) as a function of $AlPO_4$ concentration (mol %).

The materials, compounds, compositions, articles, devices, and methods described herein may be understood more readily by reference to the following detailed description of specific aspects of the disclosed subject matter and the Examples included therein and to the Figures.

Before the present materials, compounds, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the layer" includes mixtures of two or more such layers, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed, then "less than or equal to 10" as well as "greater than or equal to 10" is also disclosed. It is also understood that throughout the application, data are provided in a number of different formats, and that this data, represent endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Corning Incorporated (Corning, N.Y.), Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Also, disclosed herein are materials, compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a composition is disclosed and a number of modifications that can be made to a number of components of the composition are discussed, each and every combination and permutation that are possible are specifically contemplated unless specifically indicated to the contrary. Thus, if a class of components A, B, and C are disclosed as well as a class of components D, E, and F and an example of a composition A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

Reference will now be made in detail to specific aspects of the disclosed materials, compounds, compositions, articles, and methods, examples of which are illustrated in the accompanying Examples and Figures.

Disclosed herein, in one aspect, are methods and compositions of coating glass substrates with a glass layer or skin before any of the scoring/separation processes occur. This surface glass can then be removed, for example, after all of the finishing/inspection operations. In one example, the coating can be left on to protect the glass during shipping and then removed thereafter. A further advantage is only removing the coating from the quality or A side and leaving such a coating on the backside or B side. This allows the glass substrate to be effectively thicker during the display manufacture, lessening concerns regarding handling sag and damage. This B side coating can then be removed later in the panel manufacturing process resulting in a final, thin display.

Methods of using a soluble glass to protect a glass article have been reported (see, e.g., U.S. Pat. Nos. 4,102,664 and 4,880,453) and methods for lamination of glass sheet on a Fusion draw have disclosed in U.S. Pat. No. 4,214,886. However, such methods involve glass surface layers with high acid resistance, resulting in difficulty removing the surface layer. The methods and compositions disclosed herein allow for sharply decreasing the acid resistance of the glass while having a minimum impact on the viscosity and CTE of the glass (two properties which are important for successful hot lamination).

I. Compositions

In one aspect, described herein are glass compositions for liquid crystal display, wherein the glass composition comprises from about 1.5 to about 10 mol % of $P_2O_5$. The amount of $P_2O_5$ present in the composition can be measured by techniques known in the art, including, but not limited to, X-ray fluorescence, energy dispersive analysis and standard wet chemical techniques including, but not limited to, inductively-coupled plasma spectroscopy. In other examples, the amount of $P_2O_5$ can be from about 2 to about 8 mol %, from about 2 to about 6 mol %, or from about 2 to about 5 mol % of the composition. In still other examples, the amount of $P_2O_5$ in the composition can be about 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, or 10 mol % of the composition, where any of the stated values can be an upper or lower endpoint when appropriate.

In another aspect, the disclosed compositions can have a strain point greater than about 650° C. In other examples, a composition can have a strain point of greater than about 650, 655, 660, 665, 670, 675, 680, 685, 690, 695, 700, 705, 710, 715, 720, 725, 730, 735, 740, 745, 750 760, 770, 780, 790, or 800° C., where any of the stated values can form an upper or lower endpoint when appropriate. The strain point of the disclosed compositions can be determined by one of ordinary skill in the art using known techniques. For example, the strain point can be determined using ASTM method C336.

In a further aspect, the disclosed compositions can have a liquidus viscosity greater than about 20,000 poises. For example, a composition can have a liquidus viscosity of greater than about 20,000, 30,000, 40,000, 50,000, 60,000, 70,000, 80,000, 90,000, 100,000, 200,000, 250,000, 300,000, 350,000, 400,000, 450,000, 500,000, 550,000, 600,000, 650,000, 700,000, 750,000, 800,000, 900,000, or 1,000,000 poises, where any of the stated values can form an upper or lower endpoint when appropriate. The liquidus viscosity can be calculated by using the Fulcher equation coefficients and expressed in terms of X 100,000 poises (10,000 Pa·s.).

In yet another aspect, the disclosed compositions can have a coefficient of thermal expansion of from about $28 \times 10^{-7}/°$ C. to about $40 \times 10^{-7}/°$ C. over the temperature range of from 0° C. to 300° C. In some examples, a composition can have a coefficient of thermal expansion of about 28, 29, 30, 31, 32, 33, 34, 35, 36, 37, 38, 39, or $40 \times 10^{-7}/°$ C., where any of the stated values can form an upper or lower endpoint when appropriate. The coefficient of thermal expansion for the disclosed compositions can be determined by one of ordinary skill in the art using known techniques. For example, the coefficient of thermal expansion can be determined using ASTM method E228.

The glass compositions described herein exhibit increased weight loss when exposed to an acid. The phrase "weight loss" is defined as the amount of glass composition that is removed when exposed or contacted with a particular acid. In one aspect, the disclosed compositions can have a weight loss of at least 3 mg/cm$^2$ when immersed in 5% HCl at 95° C. for 24 hours. For example, a composition can have a weight loss of about 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 34, 36, 37, 38, 39, 40, 50, 60, 70, 80, 90, 100, 125, 150, 175, 200, 225, 250, or 300 mg/cm$^2$ when immersed in 5% HCl at 95° C. for 24 hours, where any of the stated values can form an upper or lower endpoint when appropriate. The disclosed compositions can exhibit weight loss when immersed in other acids, such as inorganic acids (e.g., HBr, $H_2SO_4$, $H_3PO_4$, $HNO_3$, and the like) and organic acids (e.g., acetic acid, formic acid, citric, benzoic, maleic, adipic, and the like). Depending upon the end-use of the glass, it may be desirable to have the weight loss of the glass composition to be more than a typical LCD glass. For example, when the disclosed compositions are used as a protective skin on a LCD substrate glass, the composition can have a weight loss 2, 3, 4, 5, 6, 7, 8, 9, 10, or more times that for the LCD substrate glass when immersed in 5% HCl at 95° C. for 24 hours.

In certain aspects, it is desirable that the glass composition be transparent. In one aspect, the disclosed compositions can have a transparency greater than 80% at 365 nm wavelength at a thickness of 0.7 mm and greater than 90% transparency at wavelengths between 450 and 800 nm for the same thickness.

In another aspect, the disclosed compositions can have a density of less than about 2.45 g/cm$^3$. For example, a composition can have a density of about 2.45, 2.45, 2.44, 2.43, 2.42, 2.41, 2.4, 2.39, 2.38, 2.37, 2.36, 2.35, 2.34, 2.33, 2.32, 2.31, 2.3, 2.29, 2.28, 2.27, 2.26, 2.25, 2.24, 2.23, 2.22, 2.21, 2.2, 2.19, 2.18, 2.17, 2.16, 2.15, 2.14, 2.13, 2.12, 2.11, 2.1, 2.09, 2.08, 2.07, 2.06, 2.05, 2.04, 2.03, 2.02, 2.01, 2, 1.99, 1.98, 1.97, 1.96, 1.95, 1.94, 1.93, 1.92, 1.91, 1.9, 1.89, 1.88, 1.87, 1.86, 1.85, 1.84, 1.83, 1.82, 1.81, 1.8, 1.79, 1.78, 1.77, 1.76, 1.75, 1.74, 1.73, 1.72, 1.71, 1.7, 1.69, 1.68, 1.67, 1.66, 1.65, 1.64, 1.63, 1.62, 1.61, 1.6, 1.59, 1.58, 1.57, 1.56, 1.55, 1.54, 1.53, 1.52, 1.51, 1.5, 1.49, 1.48, 1.47, 1.46, or 1.45 g/cm$^3$, where any of the stated values can form an upper or lower endpoint when appropriate. The density of the disclosed compositions can be determined by one of ordinary skill in the art using known techniques. For example, the density can be determined using ASTM method C693.

Any of the glass compositions disclosed in U.S. Pat. Nos. 5,374,595 and 6,319,867, which are incorporated by reference for their teachings with respect to glass compositions, can be used to produce any of the glass composition described herein. In one aspect, the glass compositions described herein comprise a glass exhibiting linear coefficients of thermal expansion over the temperature range of 0-300° C. between 28-40×10$^{-7}$/° C., strain points higher than 650° C., liquidus temperatures no higher than 1200° C., liquidus viscosities greater than about 200,000 poises (20,000 Pa), long term stability against devitrification at melting and forming temperatures, and melting viscosities of about 200 poises (20 Pa) at less than 1675° C., the glasses being essentially free from alkali metal oxides and composed of, expressed in terms of mole percent on the oxide basis, $SiO_2$ (64-70); $Y_2O_3$ (0-3); $Al_2O_3$ (9.5-14); MgO (0-5); $B_2O_3$ (5-10); CaO (3-13); $TiO_2$ (0-5) SrO (0-5.5); $Ta_2O_5$ (0-5); BaO (2-7); $Nb_2O_5$ (0-5), wherein MgO+CaO+SrO+BaO are 10-20. In another aspect, the glass compositions described herein comprise glasses exhibiting a density less than about 2.45 gm/cm$^3$ and a liquidus viscosity greater than about 200,000 poises, a strain point exceeding 650° C., and the glass comprises the following composition, expressed in terms of mol percent on an oxide basis: 65-75 $SiO_2$, 7-13 $Al_2O_3$, 5-15 $B_2O_3$, 0-3 MgO, 5-15 CaO, 0-5 SrO, and essentially free of BaO. In another aspect, the composition has less than 65 mol % $B_2O_3$. In a further aspect, the composition has 0, 1, 2, 3, 4, 5, 6, 7, 8, 9, 10, 11, 12, 13, 14, 15, 16, 17, 18, 19, 20, 22, 24, 26, 28, 30, 32, 34, 36, 38, 40, 42, 44, 46, 48, 50, 52, 54, 56, 58, 60, 62, or 64 mol % $B_2O_3$, where any value can form an end-point of a range. In one aspect, described herein is a glass composition comprising from about 1.5 to about 10 mol % $P_2O_5$ and less than 65 mol % $B_2O_3$.

Examples of suitable glasses useful to produce the glass compositions described herein include, but are not limited to, those disclosed in U.S. Pat. Nos. 5,374,595, 6,060,168, and 6,319,867, and U.S. Published Application Nos. 2002-0082158, 2005-0084440, and 2005-0001201, which are all incorporated by reference herein in their entireties. In a further aspect, the skin glass composition is Corning Code 1737 or EAGLE$^{2000}$™ glass containing 1.5 mol % to 10 mol % $P_2O_5$.

In one aspect, the compositions described herein do not contain a fining agent. In another aspect, the compositions described herein do not contain $SnO_2$.

II. Methods or Making

In one aspect, disclosed herein are methods for preparing compositions such as those described above. In one aspect, the method comprises heating a mixture of glass or components used to produce glass and a source of phosphorus, wherein the amount of the source of phosphorus is sufficient to yield a glass containing from about 1.5 mol % to about 10 mol % $P_2O_5$. The phrase "source of phosphorus" is defined herein as any compound or mixture of compounds that contains phosphorus and incorporates phosphorus into the glass composition. The amount of the source of phosphorus sufficient to yield a glass containing from about 1.5 mol % to about 10 mol % $P_2O_5$ can vary and will depend upon the phosphorus content of the source relative to that desired in the final glass as well as the desired level of weight loss. It is contemplated that the source of phosphorus can be admixed with the individual components used to produce the glass prior to heating or, in the alternative, glass that has already been produced can be doped with the source of phosphorus followed by heating.

Examples of sources of phosphorus suitable for use herein include, but are not limited to, compositions that comprise a metal phosphate, including either a metal metaphosphate, a metal polyphosphate, a metal pyrophosphate, a metal orthophosphate or a mixture thereof. In other examples, a source of phosphorus can comprise a phosphate including, but not limited to, a metal metaphosphate, a metal polyphosphate, a metal pyrophosphate, a metal orthophosphate of silicon, boron, magnesium, calcium, strontium, aluminum, barium, or a mixture thereof. Some specific examples of such metal phosphates include, but are not limited to, $SiP_2O_7$, $BPO_4$, $Mg(PO_3)_2$, $Ca(PO_3)_2$, $Sr(PO_3)_2$, and $Ba(PO_3)_2$. In still other examples, a source of phosphorus can comprise $P_2O_5$ or $H_3PO_4$. In yet a further example, a source of phosphorus can comprise aluminum metaphosphate ($Al(PO_3)_3$), aluminum orthophosphate ($AlPO_4$), or a mixture thereof.

In one aspect, a glass composition described herein involves substituting a percentage of silica used to produce a LCD glass with a source of phosphorus such as, for example, $AlPO_4$. The amount of $AlPO_4$ present in the composition can be from about 1.5 mol % to about 10 mol % of the composition. In other examples, the amount of $AlPO_4$ can be from about 4 to about 8 mol %, from about 4 to about 6 mol %, or from about 4 to about 5 mol % of the composition. In still other examples, the amount of $AlPO_4$ in the composition can be about 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, or 10 mol % of the composition, where any of the stated values can be an upper or lower endpoint when appropriate.

In another aspect of the disclosed methods, the heating step can be conducted at from about 1,500 to 1,650° C. In other aspects, the heating step can be conducted at 1,500, 1,525, 1,550, 1,575, 1,600, 1,625, or 1,650° C. The heating step is generally performed at a temperature so that the components used to produce the compositions described herein are such that a homogeneous state is produced.

III. Glass Articles and Methods of Protection

As disclosed herein, the incorporation of phosphorus in the amounts specified herein into glass compositions results in rapid degradation of acid durability. This allows for the use of the glass compositions described herein as a protective laminate or skin layer, which can be selectively removed without attack of a base or core glass. At the same time, other properties of the laminate or skin glass (its viscosity, CTE, and devitrification behavior) do not show much change.

As such, disclosed herein, in another aspect, are articles comprising a glass core comprising at least one exposed surface and a skin, wherein the skin is connected to the exposed surface of the core, wherein the skin comprises any of the glass compositions described herein. The term "connected" as used herein includes when the skin is adjacent to (i.e., intimate contact with) the exposed surface of the core or is indirectly attached to the core by way of one or more intermediate layers. The term "exposed surface" as defined herein is any surface of the core glass that can be in contact with the skin glass if contacted by the skin glass. The glass article can have one or more exposed surfaces. For example, when the glass core is a sheet of glass, the core has two exposed surfaces, wherein one or both surfaces can have a glass skin connected to it. Depending upon the nature of the skin and core glass material, a chemical bond (e.g., covalent, electrostatic) can be formed; however, a chemical bond is not required.

The skin can have a thickness of from 0.1 mm to 1.1 mm. For example, the skin can have a thickness of about 0.1, 0.12, 0.14, 0.16, 0.18, 0.20, 0.22, 0.24, 0.26, 0.28, 0.30, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, 1, 1.01, 1.02, 1.03, 1.04, 1.05, 1.06, 1.07, 1.08, 1.09, or 1.1 mm, where any of the stated values can form an upper or lower endpoint when appropriate. In another aspect, the core and skin combined can have a thickness of 0.3 mm to 1.1 mm.

In one aspect, the article can be a sheet of glass having a first and second exposed surface, wherein the skin is adjacent to both the first and second exposed surface. Putting the skin on both the first and second exposed surfaces of the glass sheet can have several advantages, for example, the glass sheet can be effectively thicker during the display manufacture, lessening concerns regarding handling sag and damage. This can allow the use of thinner, lightweight glass for display manufacture. Further, it allows for the skin to be removed from one surface (e.g., the surface that is to receive the TFTs in display manufacture), while leaving the other surface protected. For example, when a sheet of glass has a protective coating on both sides, one coating can be removed followed by manufacturing the electronics on the exposed surface of the core while the backsurface of the core remains protected, sealing the two glasses that make up a panel, and then strip off the remaining coating that is now on the outside of the assembled package. In other examples, the skin or laminate can be adjacent to either the first or the second exposed surface.

The glass compositions described herein can used to produce a protective skin layer on a glass article. In one aspect, the glass articles that can be protected can be used for electronic applications. Examples of such articles include, but are not limited to, glasses for flat screen display panels, organic light emitting diodes, or substrates for a thin film transistor. In another aspect, the glass compositions described herein can be used to protect glasses for liquid crystal displays. Liquid crystal displays (LCDs) are passive flat panel displays which depend upon external sources of light for illumination.

In one aspect, the skin can be applied to the exposed surface of the core by a fusion process. An example of a suitable fusion process is disclosed in U.S. Pat. No. 4,214,886, which is incorporated by reference herein in its entirety. This process can be summarized as follows. At least two glasses of different compositions (e.g., the base or core glass sheet and the skin) are separately melted. Each of the glasses is then delivered through an appropriate delivery system to an overflow distributor. The distributors are mounted one above the other so that the glass from each flows over top edge portions of the distributor and down at least one side to form a uniform flow layer of appropriate thickness on one or both sides of the distributor below such top edge portions.

The bottom distributor has a wedge-shaped forming member associated therewith having converging sidewall portions which communicate at their top end with the sidewalls of said distributor and terminate at their converging bottom ends in a draw line. The molten glass overflowing the bottom distributor flows downwardly along the distributor walls and forms an initial glass flow layer adjacent to the converging outer surfaces of the forming member, whereas the molten glass overflowing the distributor thereabove flows downwardly over the upper distributor walls and flows over outer surface portions of the initial layer. The two individual layers of glass from each converging sidewall of the forming member are brought together and fused at the draw line to form a single continuously laminated sheet. The central glass in a two-glass laminate is called the core glass, whereas the glasses flowing down the external surface of the core glass are called skin glasses. When three or more separate glasses are utilized, those glasses which are formed intermediate the core and skin glasses are known as either central or embedded glasses. When central or embedded glasses are used, the skin is "connected" to the core by the central or embedded glass. Conversely, when just one skin glass is fused directly to the core, the skin is "adjacent" to the core.

The overflow distributor process provides a fire polished surface to the sheet glass so formed, and the uniformly distributed thickness of the glass provided by the controlled distributor, provides a glass sheet with superior optical quality.

Other fusion processes, which can be used in the methods disclosed herein, are described in U.S. Pat. Nos. 3,338,696, 3,682,609, 4,102,664, 4,880,453, and U.S. Published Application No. 2005-0001201, which are incorporated by reference herein in their entireties.

As discussed above, the glass compositions described herein undergo weight loss when exposed to acid. Thus, a portion or all of the skin layer can be removed by contacting the skin with an acid. Any acid that can remove the laminate can be used. For example, the acid can comprise an inorganic acid or an organic acid. Examples of inorganic acids that can be used in the disclosed methods include, but are not limited to, HCl, $H_2SO_4$, $HNO_3$, or $H_3PO_4$. The acid can be applied to the protective layer using techniques known in the art. For example, the glass with the protective layer can be dipped into a solution of acid to remove the protective layer. In another aspect, the acid can be sprayed onto the protective layer. If necessary, a sonic (e.g., ultrasonic) or mechanical (e.g., brush scrubbing) action can be used during or after the protective layer has been contacted with the acid.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Example 1

$AlPO_4$-doped boroaluminosilicate glasses exhibiting the properties described herein were formed by melting batches at 1650° C. overnight in Pt crucibles. The $AlPO_4$ component can be incorporated in the glass batch either in the form of aluminum orthophosphate ($AlPO_4$) or as a mixture of alumina+aluminum metaphosphate ($Al(PO_3)_3$), with the latter being the preferred method. The following compositions in Table 1 are illustrative of the compositions disclosed herein.

TABLE 1

| | Glass | | | | | |
|---|---|---|---|---|---|---|
| | A | B | C | D | 1737 | Eagle |
| $SiO_2$ | 45.7 | 49.7 | 47.9 | 53.3 | 58.4 | 64.1 |
| $Al_2O_3$ | 22.1 | 20.5 | 21.2 | 21.0 | 16.7 | 16.6 |
| $B_2O_3$ | 7.80 | 7.22 | 6.96 | 9.77 | 8.49 | 10.46 |
| MgO | 0.70 | 0.65 | 0.62 | 0.12 | 0.76 | 0.12 |
| CaO | 3.85 | 3.57 | 3.44 | 7.34 | 4.19 | 7.86 |
| SrO | 1.77 | 1.64 | 1.54 | 0.76 | 1.92 | 0.81 |
| BaO | 8.73 | 8.09 | 7.80 | 0.07 | 9.50 | 0.07 |
| $P_2O_5$ | 9.36 | 8.68 | 10.5 | 7.63 | — | — |
| Strain Pt (° C.) | 666 | 671 | 670 | 681 | 678 | 677 |
| α ($10^{-7}$/° C.) | 36.4 | 36.0 | 35.0 | 30.6 | 35.8 | 30.8 |
| HCl (mg/cm$^2$) | 127 | 23.3 | 31.1 | 32.5 | 0.65 | 1.12 |

The first three examples (A-C) are derivatives of Corning Code 1737 glass (Corning Inc., Corning, N.Y.), while the fourth example (D) is based on EAGLE$^{2000}$™ (Corning, Inc., Corning N.Y.). Compositional and property data for laboratory prepared examples of Corning Code 1737 glass and EAGLE$^{2000}$™ are given in columns 6 and 7, respectively.

FIG. 1 is a graph of strain point (° C.) as a function of $AlPO_4$ concentration (mol %). The graph shows that $AlPO_4$ additions to the laboratory analogs of commercial LCD glasses Corning Code 1737 glass and EAGLE$^{2000}$™, either as a substitution for $SiO_2$ or as an added component cause minor change in the measured strain point over the range of 0 to 7 mol % $AlPO_4$.

Figure 2:
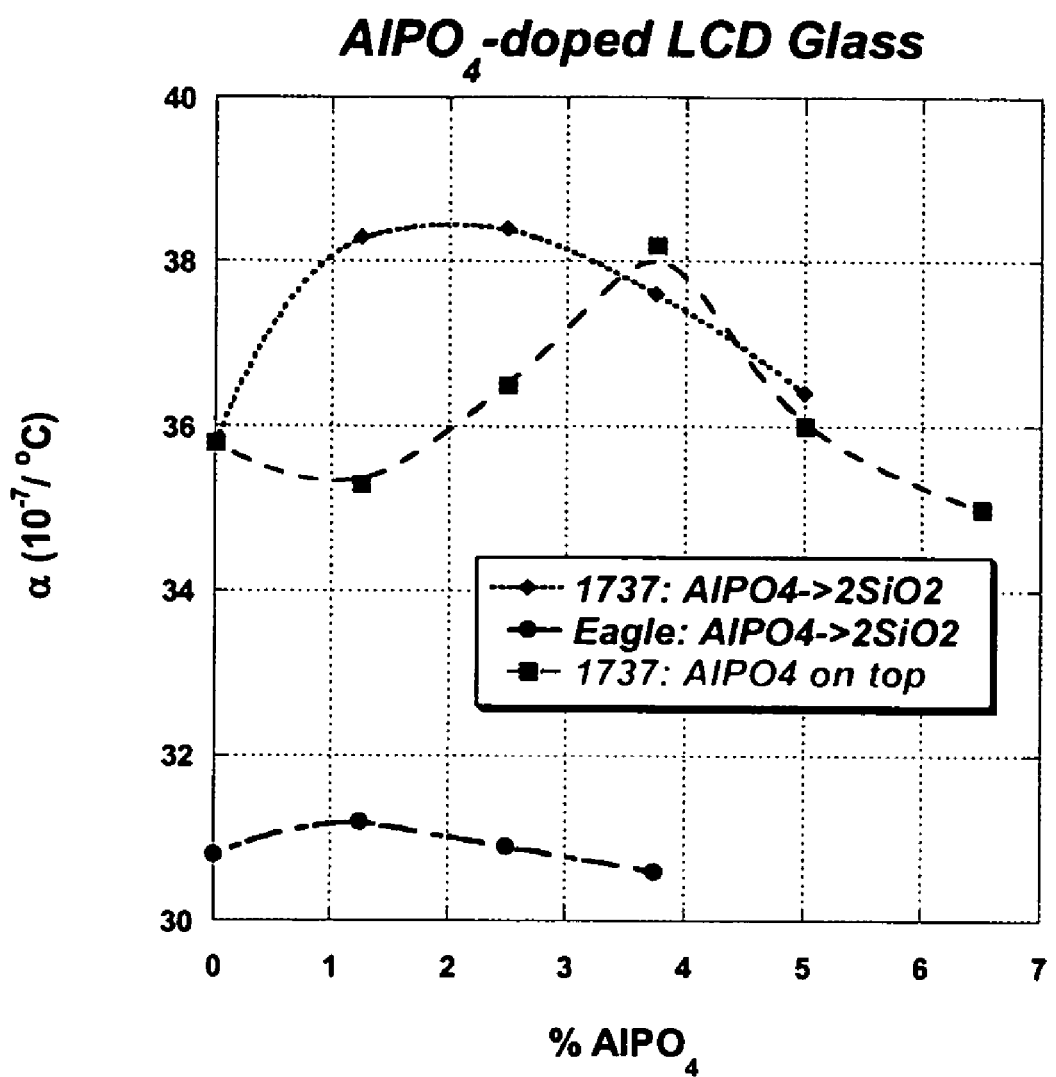
FIG. 2 is a graph of thermal expansion coefficient ($\alpha$; $\times 10^{-7}$/° C.) as a function of $AlPO_4$ concentration (mol %).

FIG. 2 is a graph of thermal expansion coefficient ($\alpha$; $\times 10^{-7}$/° C.) as a function of $AlPO_4$ concentration (mol %). The graph shows that α is generally constant over the range of $AlPO_4$ concentration, indicating that in a production environment, a laminated sheet formed from either commercial LCD glasses Corning Code 1737 glass or EAGLE$^{2000}$™ and its $AlPO_4$-substituted analogue can have substantially no stress due to thermal expansion mismatch.

Figure 3:
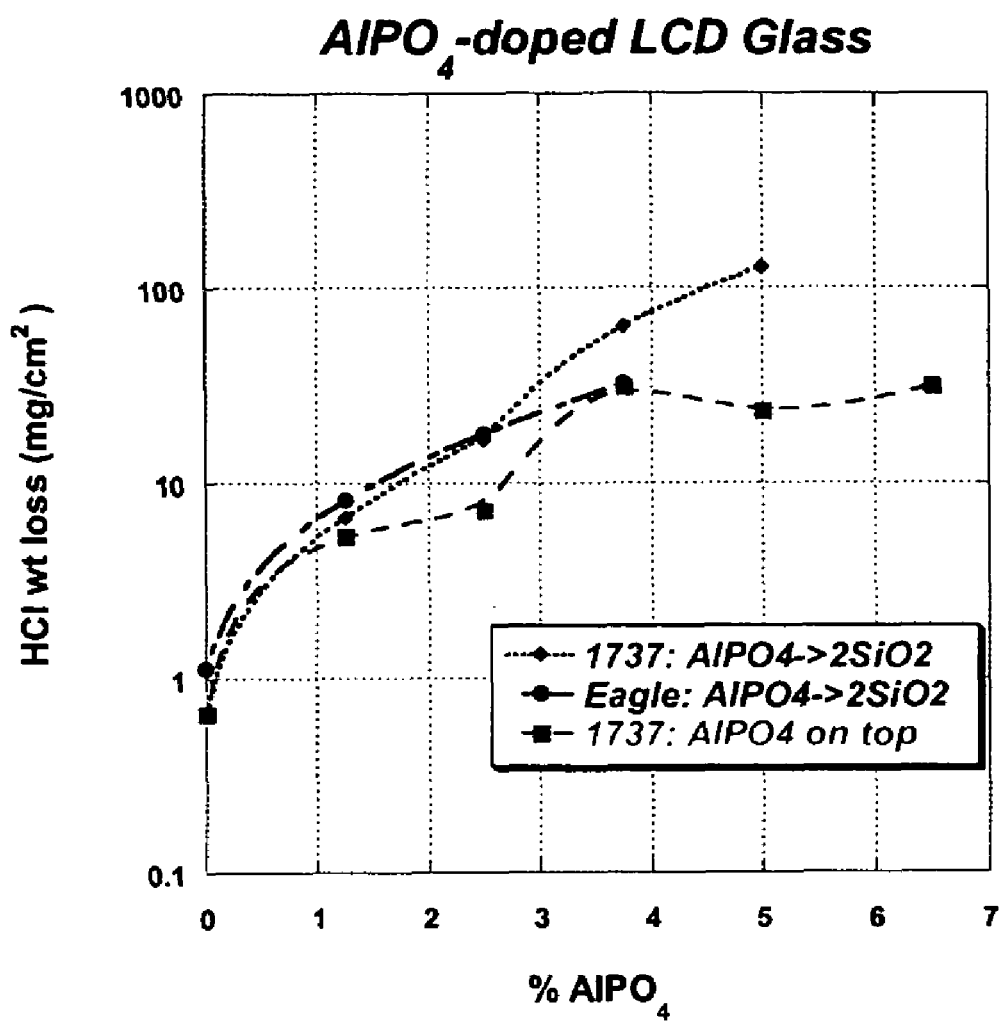
FIG. 3 is a graph of acid durability (HCl weight loss (mg/cm$^2$)) as a function of $AlPO_4$ concentration (mol %).

FIG. 3 is a graph of acid durability (HCl weight loss (mg/cm$^2$)) as a function of $AlPO_4$ concentration (mol %). The graph shows the measured weight loss on exposure to 95° C., 5% HCl for 24 hours increases by about 2 orders of magnitude as the $AlPO_4$ content increases to about 5 mol %.

Figure 4:
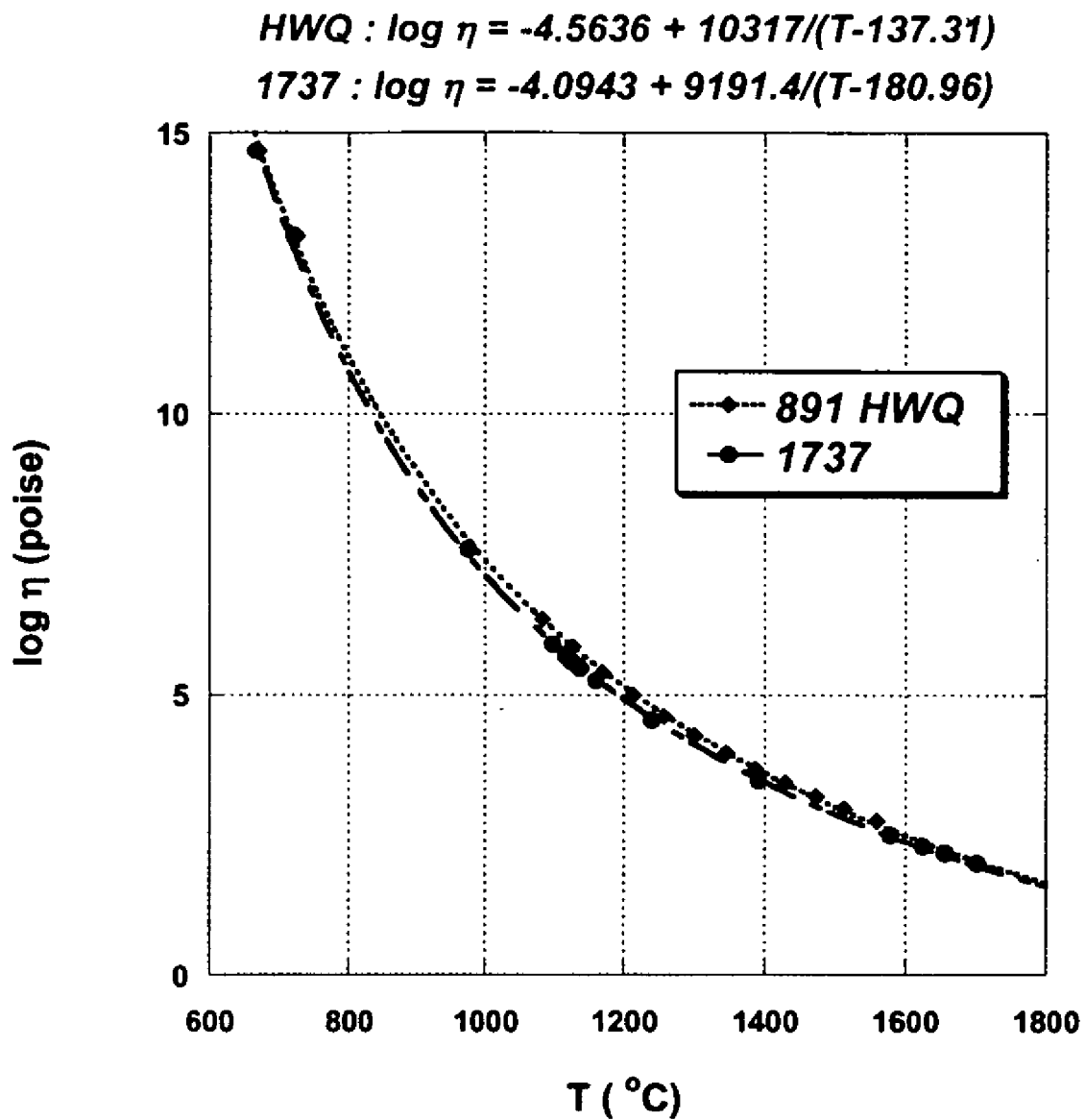
FIG. 4 is a graph viscosity ($\eta$; poise) for commercial glasses Corning Code 1737 glass (circles) and 891 HWQ (diamonds) as a function of temperature (° C.). 891 HWQ is Corning Code 1737 glass with 5% $AlPO_4$ added on top.

FIG. 4 is a graph of viscosity (η; poise) for the laboratory prepared analogs of commercial glasses Corning Code 1737 glass (circles) and 891 HWQ (diamonds) as a function of temperature (° C.). 891 HWQ is Corning Code 1737 glass with 5% $AlPO_4$ added on top. The near coincidence of the date indicates that, in a production environment, these two glasses could be coformed into laminated sheet.

Example 2

Using the procedure described in Example 1, $P_2O_5$ was added to Corning Code 1737 glass (Table 2) and EAGLE$^{2000}$™ (Table 3) in varying amounts.

TABLE 2

| | A | B | C | D | E |
|---|---|---|---|---|---|
| $SiO_2$ | 67.6 | 67.6 | 67.6 | 67.6 | 67.6 |
| $Al_2O_3$ | 11.4 | 11.4 | 11.4 | 11.4 | 13.9 |
| $B_2O_3$ | 8.48 | 8.48 | 8.48 | 8.48 | 8.48 |
| MgO | 1.31 | 1.31 | 1.31 | 1.31 | 1.31 |
| CaO | 5.2 | 5.2 | 5.2 | 5.2 | 5.2 |
| SrO | 1.29 | 1.29 | 1.29 | 1.29 | 1.29 |
| BaO | 4.31 | 4.31 | 4.31 | 4.31 | 4.31 |
| $P_2O_5$ | 1.25 | 2.5 | 3.75 | 5.0 | 5.0 |
| CTE | 36.3 | 37.0 | 37.4 | 37.6 | 36.6 |
| Strain | 676 | 671 | 663 | 662 | 672 |
| HCl | 3.38 | 10.5 | 33.7 | 121 | 34.2 |

TABLE 3

| | A | B | C | D |
|---|---|---|---|---|
| $SiO_2$ | 69.4 | 69.4 | 69.4 | 69.4 |
| $Al_2O_3$ | 10.6 | 10.6 | 10.6 | 10.6 |
| $B_2O_3$ | 9.78 | 9.78 | 9.78 | 9.78 |
| MgO | 0.2 | 0.2 | 0.2 | 0.2 |
| CaO | 9.12 | 9.12 | 9.12 | 9.12 |
| SrO | 0.51 | 0.51 | 0.51 | 0.51 |
| BaO | 0.03 | 0.03 | 0.03 | 0.03 |
| $P_2O_5$ | 1.25 | 2.5 | 3.75 | 5.0 |
| CTE | 30.5 | 31.1 | 30.5 | 31.1 |

TABLE 3-continued

|  | A | B | C | D |
|---|---|---|---|---|
| Strain | 691 | 687 | 686 | 688 |
| HCl | 6.99 | 49.5 | 109 | 234 |

Figure 5:
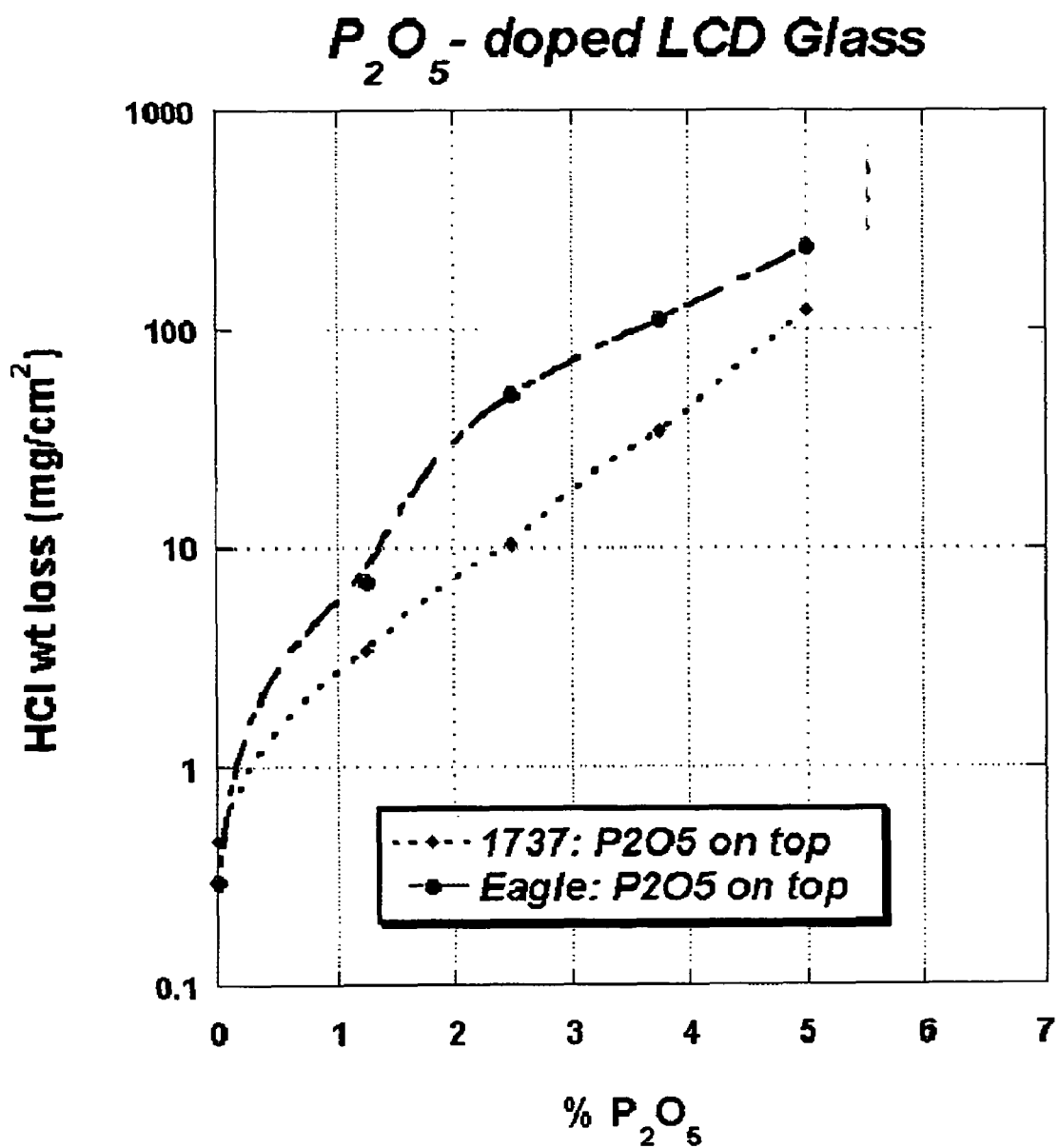
FIG. 5 is a graph of weight loss as a function of the amount of $P_2O_5$ for commercial glasses Corning Code 1737 glass and EAGLE$^{2000}$™ doped with varying amounts of $P_2O_5$.

CTE, strain and HCL refer to the thermal expansion coefficient ($10^{-7}/°$ C.), strain point (° C.) and weight loss in 5% HCl at 95° C. for 24 hrs (mg/cm$^2$), respectively. FIG. 5 is a plot analogous to FIG. 4, which illustrates the increasingly poor HCl durability of the P$_2$O$_5$-doped glasses. As the data in Tables 2 and 3 shows, when just P$_2$O$_5$ was added to the base glass, viscosity and CTE do not change significantly over the studied range.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed:

1. A glass composition for protecting an electronic display, wherein the glass composition comprises greater than 10 mol % Al$_2$O$_3$ and from greater than or equal to 2.6 to about 10 mol % P$_2$O$_5$; wherein the glass composition has a weight loss of at least 10 mg/cm$^2$ when immersed in 5% HCl at 95° C. for 24 hours; and wherein the glass composition is essentially free from alkali metal oxides.

2. The composition of claim 1, wherein the amount of P$_2$O$_5$ is from greater than or equal to 2.6 to about 8 mol %.

3. The composition of claim 1, wherein the amount of P$_2$O$_5$ is from greater than or equal to 2.6 to about 6 mol %.

4. The composition of claim 1, wherein the amount of P$_2$O$_5$ is from greater than or equal to 2.6 to about 5 mol %.

5. The composition of claim 1, wherein the composition has a strain point greater than 650° C.

6. The composition of claim 1, wherein the composition has a weight loss of at least 15 mg/cm$^2$ when immersed in 5% HCl at 95° C. for 24 hours.

7. The composition of claim 1, wherein the composition consists essentially of as calculated in mole percent on an oxide basis 57.6 to 70 SiO$_2$; 0 to 3 Y$_2$O$_3$, greater than 10 mol to 16.4 Al$_2$O$_3$, 0 to 5 MgO, 5 to 10 B$_2$O$_3$; 3 to 13 CaO, 0 to 5 TiO$_2$, 0 to 5.5 SrO, 0 to 5 Ta$_2$O$_5$, 2 to 7 BaO, and 0 to 5 Nb$_2$O$_5$, wherein MgO +CaO+SrO+BaO are from 10 to 20.

8. The composition of claim 1, wherein the composition comprises as calculated in mole percent on an oxide basis 65 to 75 SiO$_2$, greater than 10 to 13 Al$_2$O$_3$, 5 to 15 B$_2$O$_3$, 0 to 3 MgO, 5 to 15 CaO, 0 to 5 SrO, and essentially free of BaO.

9. The composition of claim 1, wherein the composition comprises less than 65 mol % B$_2$O$_3$.

10. The composition of claim 1, wherein the composition has a liquidus viscosity greater than 20,000 poises.

11. The composition of claim 1, wherein the composition has a coefficient of thermal expansion of from $28 \times 10^{-7}/°$ C. to $40 \times 10^{-7}/°$ C. over the temperature range of from 0° C. to 300° C.

12. A glass composition comprising greater than 10 mol % Al$_2$O$_3$ and from greater than or equal to 2.6 to about 10 mol % P$_2$O$_5$ and less than 65 mol % B$_2$O$_3$; wherein the glass composition has a weight loss of at least 10 mg/cm$^2$ when immersed in 5% HCl at 95° C. for 24 hours; and wherein the glass composition is essentially free from alkali metal oxides.

13. The composition of claim 1, wherein the glass composition is free of alkali metal oxides.

14. A method for producing a glass composition for protecting an electronic display, comprising heating a mixture of glass and a source of phosphorus, wherein the amount of the source of phosphorus is sufficient to yield a glass containing greater than 10 mol % Al$_2$O$_3$ and from greater than or equal to 2.6 to about 10 mol % P$_2$O$_5$; wherein the glass composition has a weight loss of at least 10 mg/cm$^2$ when immersed in 5% HCl at 95° C. for 24 hours; and wherein the glass composition is essentially free from alkali metal oxides.

15. The method of claim 14, wherein the amount of the source of phosphorus is sufficient to yield a glass containing from greater than or equal to 2.6 to about 8 mol % P$_2$O$_5$.

16. The method of claim 14, wherein the amount of the source of phosphorus is sufficient to yield a glass containing from greater than or equal to 2.6 to about 6 mol % P$_2$O$_5$.

17. The method of claim 14, wherein the amount of the source of phosphorus is sufficient to yield a glass containing from greater than or equal to 2.6 to about 5 mol % P$_2$O$_5$.

18. The method of claim 14, wherein the source of phosphorus comprises a metal phosphate, a metal polyphosphate, a metal metaphosphate, a metal pyrophosphate, or a metal orthophosphate or a mixture thereof.

19. The method of claim 14, wherein the source of phosphorus comprises a phosphate, wherein the phosphate comprises a polyphosphate, a metaphosphate, a pyrophosphate, or an orthophosphate of silicon, boron, magnesium, calcium, strontium, aluminum, barium or a mixture thereof.

20. The method of claim 14, wherein the source of phosphorus comprises H$_3$PO$_4$.

21. The method of claim 14, wherein the source of phosphorus comprises aluminum metaphosphate, aluminum orthophosphate, or a mixture thereof.

22. The method of claim 14, wherein the source of phosphorus comprises P$_2$O$_5$.

23. The method of claim 14, wherein the heating step is conducted at from 1,500 to 1,650° C.

* * * * *

UNITED STATES PATENT AND TRADEMARK OFFICE
CERTIFICATE OF CORRECTION

PATENT NO. : 7,635,521 B2 Page 1 of 1
APPLICATION NO. : 11/351360
DATED : December 22, 2009
INVENTOR(S) : Bruce Gardiner Aitken et al.

It is certified that error appears in the above-identified patent and that said Letters Patent is hereby corrected as shown below:

| Col. | Line | Description |
|---|---|---|
| 13 | 33 | Please delete "HCI" and add --HCl-- |
| 13 | 46 | Please delete "HCI" and add --HCl-- |
| 14 | 13 | Please delete "HCI" and add --HCl-- |
| 14 | 24 | Please delete "HCI" and add --HCl-- |

Signed and Sealed this

Twenty-fourth Day of August, 2010

David J. Kappos
*Director of the United States Patent and Trademark Office*